United States Patent
Sheldrake

[15] 3,691,442
[45] Sept. 12, 1972

[54] CONTROL CIRCUIT FOR AUTOMATICALLY SHUTTING OFF THE WINDSHIELD WIPERS SUBSEQUENT TO WASHER OPERATION

[72] Inventor: Leonard J. Sheldrake, Noblesville, Ind.

[73] Assignee: General Motors Corporation, Detroit, Mich.

[22] Filed: Aug. 25, 1971

[21] Appl. No.: 174,603

[52] U.S. Cl............318/443, 318/DIG. 2, 15/250.13
[51] Int. Cl................................................H02p 3/16
[58] Field of Search.............318/DIG. 2, 443, 444; 15/250.13

[56] References Cited

UNITED STATES PATENTS

| | | |
|---|---|---|
| 3,032,270 | 5/1962 | Corbin.................318/443 X |
| 3,253,206 | 5/1966 | Romanowski..........318/466 |
| 3,500,159 | 3/1970 | Kearns.................318/443 X |
| 3,609,496 | 9/1971 | Peroy et al.............318/444 |

*Primary Examiner*—Benjamin Dobeck
*Attorney*—W. E. Finken et al.

[57] ABSTRACT

In a preferred form, this disclosure relates to an electrical control system having a control circuit means for initiating conjoint operation of a windshield wiper unit and washer unit for an automotive vehicle in response to momentary depression of a washer button switch and for automatically shutting off the wiper unit subsequent to the cessation of washer operation. The electrical control system comprises a power source, an electric motor means, an electrically operated washer unit and a first control circuit means including a manual switch for effecting either low or high speed continuous operation of the wipers and a second control circuit means including a manually operated washer switch for controlling operation of the washer unit and for initiating conjoint operation of the wiper unit with the wiper unit shutting off automatically subsequent to the cessation of washer operation.

3 Claims, 1 Drawing Figure

PATENTED SEP 12 1972 3,691,442
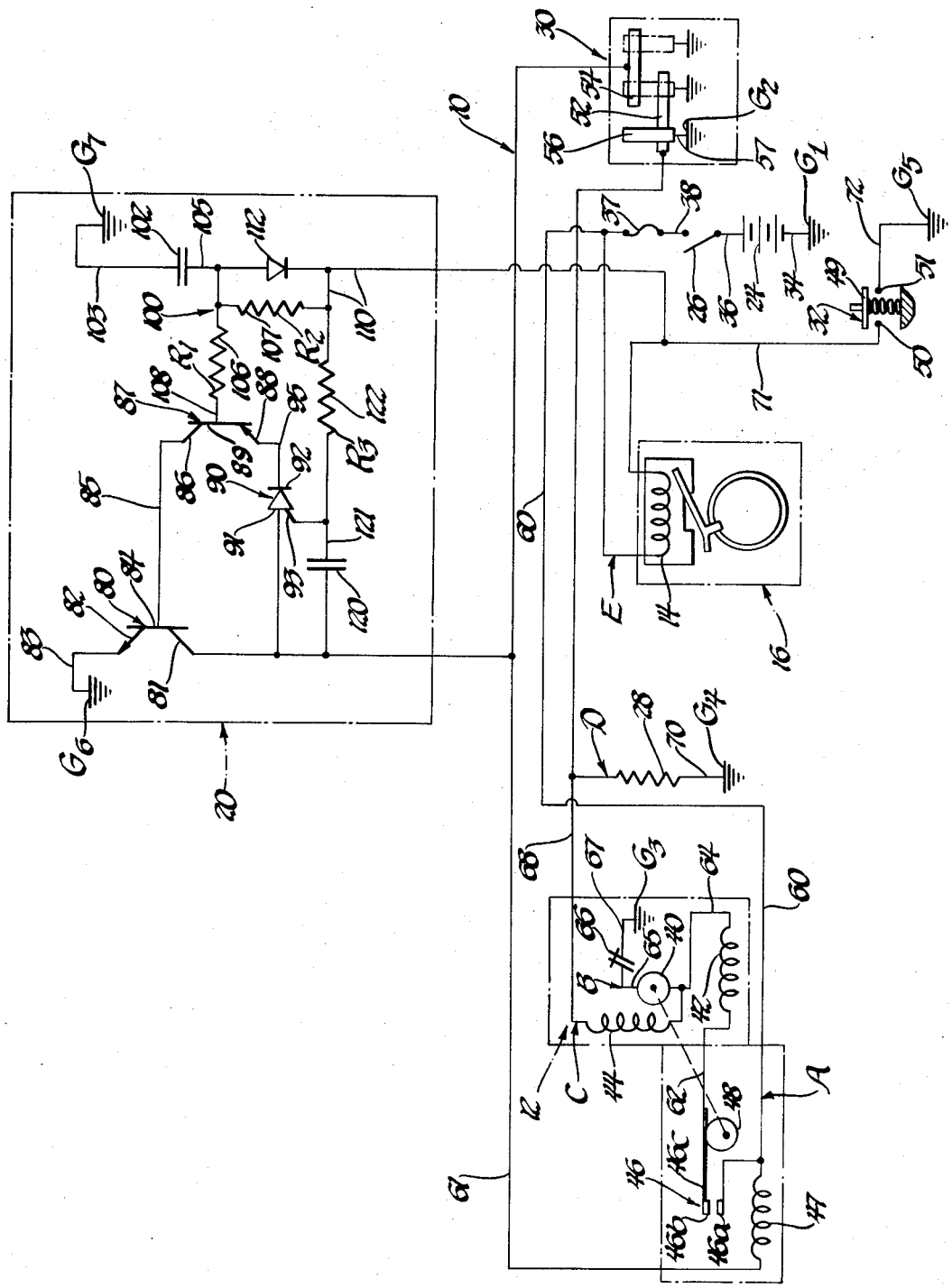
INVENTOR.
Leonard J. Sheldrake
BY
W. A. Schuetz
ATTORNEY

CONTROL CIRCUIT FOR AUTOMATICALLY SHUTTING OFF THE WINDSHIELD WIPERS SUBSEQUENT TO WASHER OPERATION

The present invention relates to a control system for controlling operation of the windshield wiper unit, and in particular to an electrical control system for controlling conjoint operation of the windshield wiper and washer units and in which the wiper unit is shut off at a predetermined time subsequent to the cessation of washer operation.

Heretofore, electrical control systems for controlling operation of a windshield wiper unit and a washer unit for an automotive vehicle have been provided. These known systems have included a manually operable switch means for effecting either low or high speed continuous operation of a wiper motor for oscillating a pair of windshield wipers and a second manual control switch which is momentarily depressible to effect energization of an electrically operated washer unit. These known systems have also included a manually depressable switch for energizing the washer unit and energizing the wiper unit and with the wiper unit shutting off automatically subsequent to the cessation of washer operation. In these latter systems the wiper motor is kept energized subsequent to the cessation of washer operation by a time delay means in the form of a mechanical timer, a pneumatic timer or an electrical timer. Electrical timers have included bimetal switches and R-C timers wherein a discharging capacitor governs the length of time the wiper unit remains energized.

The present invention provides an electrical control system for controlling operation of the wiper and washer units of an automotive vehicle and which includes (1) a first conventional control circuit means including a first manual switch means effecting either high or low speed continuous operation of the windshield wipers and a second manual control switch for controlling operation of the washer unit, and (2) a novel second control circuit means which is responsive to momentary depression of the washer switch to effect simultaneous or conjoint operation of the windshield wiper and washer units and with the wiper unit shutting off at a predetermined time subsequent to the cessation of washer operation.

Accordingly, an important object of the present invention is to provide a new and improved electrical control system for effecting conjoint operation of the windshield wiper and washer unit of an automotive vehicle and in which the wiper unit shuts off automatically subsequent to the cessation of washer operation and which includes a control circuit means having transistor means for controlling energization of an electric motor, a controlled switch for controlling current flow to the transistor means, an R-C time delay means including a capacitor operatively connected with the transistor means and the controlled switch and a momentarily actuatable washer switch operatively connected with the capacitor and the washer unit, and in which the control circuit means functions to charge the capacitor when the automotive vehicle is operating and apply positive voltage to the base of the transistor means and the controlled switch to render them nonconductive, to immediately discharge the capacitor when the washer switch is momentarily closed and remove the positive voltage from the base of the transistor and the controlled switch to turn them on and thereby effect conjoint energization of the wiper unit and washer unit and to maintain the wiper unit energized until the transistor means is turned off upon the capacitor being recharged.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawing forming a part of this specification and in which:

The drawing schematically shows the preferred embodiment of the electrical control system for controlling operation of a wiper unit and washer unit for an automotive vehicle of the present invention.

As representing a preferred embodiment of the present invention, the drawing shows an electrical control system for controlling operation of an electric motor means 12 of a windshield wiper unit and a relay 14 of a windshield washer unit 16 for an automotive vehicle (not shown). The control system broadly comprises a first control circuit means, designated generally by the reference numeral 10, which is selectively operable to effect continuous operation of a DC unidirectional wiper motor 12 at either low or high speed and selectively operable to effect energization of the relay 14 of the washer unit 16. The electrical control systems further include a second control circuit means, designated generally by the reference numeral 20, which is connected in parallel with the first control circuit means and which is selectively operable to effect conjoint operation of the washer unit 16 and the wiper unit and to automatically shut off the wiper unit at a predetermined time period subsequent to the cessation of washer operation.

The first control circuit means 10 includes a battery 24, a vehicle ignition switch 26, the electric motor means 12, a resistor 28, a manually manipulatable wiper switch 30, the washer unit relay 14, and a manually manipulatable washer unit switch 32. The battery 24 has one terminal connected via wire or conductor 34 to ground G, and its other terminal connected via wire 36 to the ignition switch 26.

The electric motor means 12 comprises an armature 40, series field winding 42 connected in series with the armature 40, a shunt field winding 44, the resistor 28 and a park switch 46 and its associated relay 47. The park switch 46 includes a stationary contact 46a and a movable contact 46b carried by a leaf spring 46c. The leaf spring 46c is inherently self-biased toward a closed position in which the contacts 46b and 46a engage each other, but is normally held open in opposition to its biasing force by a cam 48 eccentrically secured to the armature 40. The cam 48 is in the position shown in the drawing in which it holds the park switch 46 in its open position when the wiper motor 12 is de-energized.

The wiper unit could be of any suitable or conventional construction, but is preferably of the type shown and described in U.S. Pat. No. 3,253,206. Likewise, the washer unit 16 could be of any suitable or conventional construction, but is preferably a programmed washer unit which operates for a predetermined number of cycles of operation of the wiper unit upon its associated relay coil 14 being momentarily energized. The washer unit 16 is preferably like that shown in U.S. Pat. No. 3,503,090.

The manual control switch 30 could be of any suitable or conventional construction, but is preferably of the type which includes a wiper switch actuator which is movable between off, low and high speed positions. The washer switch 32 includes a push button washer switch actuator 49 which can be depressed to initiate washer operation. The washer switch actuator 49 is normally spring biased toward an open position, as shown in the drawing, but is momentarily depressible in opposition to the biasing force of the spring to bridge a pair of contacts 50 and 51.

As schematically shown in the drawing, the manually manipulatable wiper switch 30 includes a pair of stationary metal contacts 52 and 54 and a movable bridging member 56. The bridging member 56 is connected to a suitable ground $G_x$ via a wire 57. The movable contact 56 is movable from an off position to either a low or high speed position in which it respectively bridges the stationary contacts 52 and 54 and bridges only the contact 54.

Operation of the control circuit means 10 will be described with reference to the drawing. When the operator of the vehicle desires continuous low speed operation of the wiper motor 12, he will actuate the wiper switch 30 to move the bridging member 56 from its off position to its low speed position. When the bridging member 56 is moved to its low speed position a circuit A for energizing the relay coil 47 for moving the park switch 46 to its closed position is energized. Circuit A is from battery 24, wire 36, ignition switch 26, wire 38, circuit breaker 37, wire 60, relay coil 47, wire 61, stationary contact 54, bridging member 56, wire 57 to ground $G_2$. When the relay coil 47 is energized the leaf spring member 46 of the park switch is caused to be moved in opposition to the cam 48 to its closed position in which the contacts 46a and 46b engage each other. The engagement of these contacts will complete circuits B and C for energizing the wiper motor 12. Circuit B is from battery 24, wire 36, ignition switch 26, wire 38, circuit breaker 37, wire 60, now closed contacts 46a and 46b of park switch 46, wire 62, series field windings 42, wire 64, armature 40, wire 65, motor circuit breaker 66, wire 67, to ground $G_3$. The circuit C is from wire 64, shunt field windings 44, wire 68, stationary contact 52, bridging member 56, wire 57, to ground $G_2$. The electric motor 12 will operate at low speed to continuously operate the wipers at low speed as long as the bridging member remains in its low speed position.

When the operator desires high speed operation of the wiper motor 12, he will actuate the wiper switch to move the bridging member 56 to its high speed position. Movement of the bridging member 56 to its high speed position completes the hereinbefore described circuit A for energizing the park switch relay 47. When the park switch relay 47 is energized the park switch 46 is moved to its closed position, which in turn completes the hereinbefore described circuit B for energizing the series field winding 42 and armature 40 of the wiper motor 12. The hereinbefore described circuit C for energizing the shunt field windings 44, however, is not energized when the bridging member 56 is in its high speed position, since the latter is no longer engaged with the stationary contact 52 and hence the ground path to $G_2$ is broken. Movement of the bridging member 56 to the high speed position, however, completes a circuit D for energizing the shunt field windings 44 through the resistor 28, which is connected to the wire 68 and connected to a ground $G_4$ via a wire 70. When the shunt field windings 44 are energized through their resistor 28, high speed operation of the wiper motor is effected, and in a manner well known to those skilled in the art.

When the bridging contact 56 of the wiper switch 30 is in either its low or high speed position, the washer unit 16 can be energized in response to momentary depression of the switch member 49 of the washer switch 32 to its closed position to bridge the contacts 50 and 51. This completes the circuit E for energizing the relay coil 14 for initiating operation of the washer unit 16. The circuit E is from battery 24, wire 36, ignition switch 26, wire 38, circuit breaker 37, wire 60, relay coil 14, wire 71, switch contact 50, switch member 49, switch contact 51, wire 72 to ground $G_5$. As alluded to hereinbefore, the washer unit 16 is preferably a programmed washer unit which upon momentary energization of the relay coil 14 operates for a predetermined number of wiper strokes and then automatically shuts off.

In accordance with the provisions of the present invention, the electrical control system also includes a second control circuit means 20 connected in parallel with the first control circuit means 10 and which is operable in response to momentary depression of the washer switch 32 to effect conjoint operation of the washer unit 16 and the wiper unit and with the wiper unit shutting off after a predetermined number of cycles of operation subsequent to the cessation of washer operation.

The control circuit means 20 includes a first NPN transistor 80 having a collector 81 connected via wire 61 to the park switch relay coil 47, an emitter 82 connected via wire 83 to ground $G_6$ and a base 84. The base 84 of the NPN transistor 80 is connected via a wire 85 to a collector 86 of a second PNP transistor 87. The PNP transistor 87 also has an emitter 88 and a base 89.

The control circuit means 20 further includes a suitable or conventional controlled or control gate switch 90 having an anode 91, a cathode 92 and a gate 93. The anode 91 is connected to wire or conductor 61, and the cathode 92 is connected via a wire 95 to the emitter 88 of the transistor 87. The control switch 90 functions to control the current flow through the emitter-collector circuit of the transistor 87 and is of the type which is biased on when the gate voltage is negative relative to the voltage of the anode and remains biased on, even when the gate voltage subsequently becomes positive, until the transistor 87 is turned off. The controlled switch 90 could be an SCR, but is preferably a PUT transistor.

The control circuit means 20 further includes a first R-C electrical time delay means 100. The R-C electrical time delay means 100 comprises a capacitor 102 whose negative side is connected via wire 103 to a ground $G_7$ and whose positive side is connected via a wire 105 to one end of a resistor 106 and one end of a resistor 107. The other end of the resistor 106 is connected via wire 108 to the base of transistor 87 and the other end of the resistor 107 is connected via a wire or conductor 110 to the wire 71. A diode 112 is connected in parallel with the resistor 107 and to the wires 105 and 110. The control circuit means 20 additionally includes a second R-C time delay means comprising a capacitor 120 having one side connected to the wire 61 and its other side connected via wire 121 to the gate 93 of the controlled switch 90 and a resistor 122 having one end connected to the wire 121 and its other end connected to the wire 110. In the preferred embodiment, the resistor 106 has a resistance of 4.7 k ohms, the resistor 107 has a resistance of 470 k ohms and the resistor 122 has a resistance of 100 k ohms. The capacitor 102 is a 20 microfarad capacitor and the capacitor 120 is a 0.22 microfarad capacitor.

When the ignition switch 26 is turned on positive voltage from the battery 24 is applied to the anode 91 of the control switch via wire 60, park switch relay 47 and wire 61. Positive voltage is also applied to the gate 93 of the controlled switch 90 and to the base 89 of the transistor 87 via the washer relay 14, wire 110 and through the resistors $R_3$, and $R_2$ and $R_1$, respectively. Also with the ignition switch 26 on, the capacitor 102 is fully charged.

When the operator of the vehicle desires to initiate conjoint washer and wiper operation and with the wipers shutting off automatically subsequently to the cessation of washer operation, he will merely depress the washer button switch 32. Depression of the washer button switch completes the hereinbefore described circuit E for energizing the relay coil 14 of the washer unit 16. The depression of the washer button 32 also causes the capacitor 102 to be immediately discharged through wire 105, diode 112, wire 110, wire 71, and through the washer button 49 to ground $G_5$. When the capacitor 102 is discharged the positive voltage at the base of the transistor 87 and the gate of the control switch 90 is removed. This biases the PNP transistor 87 on and biases the control switch 90 on. When this occurs current flows from the anode 91 of the control switch to the cathode 92 thereof and thence through the emitter-collector circuit of the transistor 87 to apply positive voltage to the base of the transistor 80. When this occurs the transistor 80 is turned on to complete a circuit for the park switch relay 47 to effect energization of the wiper motor 12. This circuit is from battery 24, wire 37, ignition switch 26, wire 38, circuit breaker 37, wire 60, park switch relay 47, wire 61, collector 81, emitter 82 of transistor 80, wire 83 to ground $G_6$. When the park switch relay 47 is energized the park switch 46 is moved to its closed position to effect energization of the series field windings 42 and armature 40 of the wiper motor and the shunt field windings 44 of the wiper motor, and in the same manner as that hereinabove described with reference to continuous low speed operation.

When the washer button switch 32 is released, the ground path to the ground $G_5$ is broken and the capacitor 102 begins to charge. The capacitor 102 begins to charge both as a result of leakage current from the emitter to base circuit of the transistor 87 and through the relay coil 14 and resistor 107. The transistor 87 remains biased on until the capacitor 102 is fully charged, and with the length of time required to charge the capacitor 102 being primarily governed by the resistor 107. It should be noted that even though positive voltage is applied to the gate 93 of the controlled switch 90 when the washer button 49 is released, the controlled switch 90 remains energized, since once it is turned on it will remain energized until the transistor 87 is biased off.

When the capacitor 102 is fully charged, positive battery voltage is again applied to the base of the transistor 87, which turns off the transistor 87. This in turn interrupts the emitter to collector circuit of the transistor 87, which in turn biases off the NPN transistor 80. When the transistor 80 is biased off, the wiper motor 12 is de-energized. Also turning off the transistor 87 causes the control switch 90 to be turned off, since the transistor 87 is no longer conducting current through its emitter to collector circuit. It the windshield wipers should not be in their inboard or park position when the wiper motor 12 is de-energized, the motor 12 will remain energized until the wipers reach their park position due to the provision of the cam 48 and park switch 46, which is biased to a closed position. When the wipers reach their park position, the cam 48 opens the park switch 46 to effect de-energization of the wiper motor 12.

The time delay means 100 is preferably such that the wiper unit would remain energized for one or two cycles of operation subsequent to the cessation of washer unit operation. The primary function of the controlled switch 90 is to prevent energization of the wiper unit upon turning on the ignition switch 26 of the vehicle. This is because when the vehicle is sitting idle with the ignition switch 26 off the charge on the capacitor 102 tends to leak off. Thus, when the ignition switch 26 is turned on the voltage at the base of the transistor 87 would be momentarily negative with respect to the voltage at the emitter 88 thereof, due to the resistors 106 and 107. To prevent the wiper unit from being turned on each time the ignition switch 26 is turned on, the control switch 90 is employed which serves to block any positive voltage being applied to the emitter 88 of the transistor 87. Therefore, the only time the control circuit means 20 can be energized is when the capacitor 102 is purposely discharged subsequent to the ignition switch 26 being turned. The capacitor 120 serves as the filter capacitor to filter out voltage spikes, noise, etc.

An important advantage of the control circuit means 20 is that the length of time the wiper unit remains energized is governed by the length of time required to charge the capacitor 102. In previous or known R-C time delay circuits the length of time the wiper unit was energized depended upon the length of time the capacitor discharged, which in turn required a very carefully controlled discharge rate to operate properly, i.e., to insure the wiper unit remained energized only for a predetermined time period. Since the time to control the charging of a capacitor can be more readily controlled, the instant control circuit means provides for a very accurate control.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. An electrical control system for controlling operation of a windshield wiper unit for a predetermined length of time and then automatically de-energize the same comprising:
   a DC power source:
   an ignition switch;
   an electric motor means operatively connected with said power source through said ignition switch;
   a transistor means operatively connected with said motor means and effecting energization of the latter when biased on;
   a controlled switch for controlling current flow to the transistor means, said controlled switch having an anode connected with said power source, a cathode connected with said transistor means and a gate;
   an R-C time delay means including a capacitor operatively connected with said power source, the gate of said controlled switch and said transistor means at its base,
   said capacitor being charged when said ignition switch is on and said gate of said controlled switch and said base of said transistor means being applied with positive voltage when said ignition switch is on;
   a manually manipulatable momentary switch connected in series with said capacitor and being operable when moved momentarily to a closed position to directly connect the capacitor to ground and thereby remove the positive voltage from the base of the transistor means and the gate of the controlled switch whereby the control switch is rendered conductive and the transistor is biased on to effect energization of the electric motor means, said controlled switch being biased on until said capacitor is recharged whereupon said transistor means is biased off and said electric motor is de-energized.

2. An electrical control system for controlling operation of a windshield wiper unit and a washer unit and for automatically shutting off the wiper unit subsequent to the cessation of washer unit operation comprising:
   a DC power source;
   an ignition switch;
   an electric motor means operatively connected with said power source through said ignition switch;
   a transistor means operatively connected with said motor means and effecting energization of the latter when biased on;
   a controlled switch for controlling current flow to the transistor means, said controlled switch having an anode connected with said power source, a cathode connected with said transistor means and a gate;
   an R-C time delay means including a capacitor operatively connected with said power source, the gate of said controlled switch and said transistor means at its base,
   said capacitor being charged when said ignition switch is on and said gate of said controlled switch and said base of said transistor means being applied with positive voltage when said ignition switch is on;
   a washer unit relay;
   a manually manipulatable momentary switch connected in series with said washer unit relay and with said capacitor and being operable when moved momentarily to a closed position to effect energization of the washer unit relay and directly connect the capacitor to ground and thereby remove the positive voltage from the base of the transistor means and the gate of the controlled switch whereby the controlled switch is rendered conductive and the transistor is biased on to effect energization of the electric motor means, said controlled switch being biased on until said capacitor is recharged whereupon said transistor means is biased off and said electric motor is de-energized.

3. An electrical control system for initiating conjoint operation of a windshield wiper unit and a windshield washer unit and for automatically shutting off the wiper unit subsequent to the cessation of washer unit operation comprising:
   a DC power source;
   an ignition switch connected with said power source;
   an electric motor means;
   an NPN transistor for effecting energization of said motor means when biased on;
   a PNP transistor;
   a controlled switch for controlling current flow to the transistor means, said controlled switch having an anode connected with said power source, a cathode connected with the emitter of said PNP transistor and a gate, said PNP transistor having its collector connected to the base of said NPN transistor, said NPN transistor having its collector connected with said electric motor means and its emitter connected with a ground, said gate of said controlled switch being connected via a resistor in series with said power source; an R-C time delay means including a capacitor and second and third resistors, said capacitor being connected via said second resistor with said power source and via said third resistor to the base of said PNP transistor;
   a momentarily actuatable manual control switch, a washer unit relay, said controlled switch being connected in series with said washer unit relay and being connected in series with said capacitor, said capacitor being charged when said ignition switch is on and positive voltage from said power source being supplied to the base of the PNP transistor and to the gate of the controlled switch to render the PNP transistor and the controlled switch non-conductive, said manual switch when momentarily actuated providing a ground path to immediately discharge the capacitor and to energize the relay of the washer unit, said capacitor when discharged functioning to turn on the PNP transistor and to render the controlled switch conductive to current whereby said NPN transistor is biased on and said electric motor means is energized, said capacitor recharging upon release of said manual controlled switch at a rate governed by the second and third resistors and when charged a predetermined amount effecting a positive bias on the PNP transistor to turn the first transistor off, which in turn turns the controlled switch off and de-energizes said electric motor means.

* * * * *

PO-1050
(5/69)

UNITED STATES PATENT OFFICE
CERTIFICATE OF CORRECTION

Patent No. __3,691,442__          Dated __September 12, 1972__

Inventor(s) __Leonard J. Sheldrake__

It is certified that error appears in the above-identified patent and that said Letters Patent are hereby corrected as shown below:

Column 2, line 47 "G" should read --$G_1$--.
Column 3, line 21, "G" should read --$G_2$--.  Column 6, line 20 "It" should read --If--.

Signed and sealed this 29th day of May 1973.

(SEAL)
Attest:

EDWARD M. FLETCHER, JR.        ROBERT GOTTSCHALK
Attesting Officer              Commissioner of Patents